(12) United States Patent
Hong et al.

(10) Patent No.: US 12,062,809 B2
(45) Date of Patent: Aug. 13, 2024

(54) INORGANIC PARTICLE COATING COMPOSITION INCLUDING BINDER, SILANE-BASED DISPERSANT, FATTY ACID, AND POLYMER POLYOL, METHOD FOR PREPARING SEPARATOR USING THE SAME, AND SEPARATOR AND LITHIUM BATTERY EMPLOYING THE SEPARATOR

(71) Applicant: Samsung SDI Co., Ltd., Yongin-si (KR)

(72) Inventors: Daehyun Hong, Yongin-si (KR); Dowon Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 298 days.

(21) Appl. No.: 17/196,826

(22) Filed: Mar. 9, 2021

(65) Prior Publication Data
US 2021/0288383 A1    Sep. 16, 2021

(30) Foreign Application Priority Data

Mar. 10, 2020    (KR) .................. 10-2020-0029806

(51) Int. Cl.
*H01M 50/457*    (2021.01)
*C09D 7/45*    (2018.01)
(Continued)

(52) U.S. Cl.
CPC ............ *H01M 50/457* (2021.01); *C09D 7/45* (2018.01); *C09D 7/61* (2018.01); *C09D 7/63* (2018.01);
(Continued)

(58) Field of Classification Search
CPC ......... H01M 50/457; C09D 7/65; C09D 7/61; C09D 7/45; C09D 7/63; C09D 127/16; C09D 127/20
(Continued)

(56) References Cited

U.S. PATENT DOCUMENTS 9,083,035 B2    7/2015    Yeou et al.
10,096,810 B2    10/2018    Kim et al.
(Continued)

FOREIGN PATENT DOCUMENTS

CN    103325975 A    9/2013
CN    103904276 A    7/2014
(Continued)

OTHER PUBLICATIONS

"Polymer." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1279316. (Year: 2010).*
(Continued)

*Primary Examiner* — Sean P Cullen
(74) *Attorney, Agent, or Firm* — Lewis Roca Rothgerber Christie LLP

(57) ABSTRACT

A coating composition is used to prepare a separator for a rechargeable lithium battery. The coating composition includes inorganic particles, a binder, a silane-based dispersant, and a polymeric additive, the silane-based dispersant includes a silane-based compound having fewer than 8 carbons in an alkyl main chain, and the polymeric additive includes a fatty acid compound and a polymer polyol. The coating composition may have secured or improved long-term storage stability, and may thus provide for a composite separator having a reduced number of black spot defects after coating the separator.

19 Claims, 2 Drawing Sheets

(51) Int. Cl.
  *C09D 7/61* (2018.01)
  *C09D 7/63* (2018.01)
  *C09D 7/65* (2018.01)
  *C09D 127/16* (2006.01)
  *C09D 127/20* (2006.01)
  *H01M 10/0525* (2010.01)

(52) U.S. Cl.
  CPC .............. *C09D 7/65* (2018.01); *C09D 127/16* (2013.01); *C09D 127/20* (2013.01); *H01M 10/0525* (2013.01)

(58) Field of Classification Search
  USPC ......................................... 429/144, 251, 254
  See application file for complete search history.

(56) References Cited

U.S. PATENT DOCUMENTS

| | | | |
|---|---|---|---|
| 2006/0079645 A1* | 4/2006 | Hasegawa | C08L 43/04 525/191 |
| 2009/0142657 A1* | 6/2009 | Yen | H01M 50/417 429/145 |
| 2013/0199030 A1* | 8/2013 | Song | H01M 10/058 29/623.5 |
| 2013/0225745 A1* | 8/2013 | Fujimoto | C09J 133/04 524/506 |
| 2013/0252066 A1 | 9/2013 | Yeou et al. | |
| 2015/0099824 A1 | 4/2015 | Martin et al. | |
| 2015/0280197 A1 | 10/2015 | Zhao et al. | |
| 2017/0033348 A1* | 2/2017 | Murakami | H01M 4/131 |
| 2018/0111153 A1* | 4/2018 | Tanikawa | B01D 67/0016 |
| 2018/0233725 A1 | 8/2018 | Yasuda et al. | |
| 2020/0203694 A1 | 6/2020 | Yun et al. | |
| 2021/0280943 A1 | 9/2021 | Hong | |

FOREIGN PATENT DOCUMENTS

| | | | | |
|---|---|---|---|---|
| CN | 104393217 A | * | 3/2015 | ............. H01M 2/14 |
| CN | 105140451 A | * | 12/2015 | ............ H01M 2/145 |
| CN | 105764998 A | | 7/2016 | |
| CN | 107710454 A | | 2/2018 | |
| CN | 107785522 A | | 3/2018 | |
| CN | 108390000 A | * | 8/2018 | |
| CN | 108417764 A | * | 8/2018 | ........ H01M 10/0525 |
| CN | 109088034 A | * | 12/2018 | |
| CN | 109167006 A | * | 1/2019 | ........ H01M 10/0525 |
| CN | 109192903 A | | 1/2019 | |
| KR | 10-2013-0107550 | | 10/2013 | |
| KR | 10-2014-0014493 | | 2/2014 | |
| KR | 2015084116 A | * | 7/2015 | |
| KR | 10-2016-0090468 | | 8/2016 | |
| KR | 10-1841805 B1 | | 3/2018 | |
| KR | 10-1854716 B1 | | 5/2018 | |
| KR | 10-1933993 B1 | | 12/2018 | |
| KR | 10-2019-0022125 A | | 3/2019 | |
| KR | 2019022125 A | * | 3/2019 | .......... H01M 10/052 |
| KR | 10-2019-0067124 A | | 6/2019 | |
| WO | WO-2020066844 A1 | * | 4/2020 | |

OTHER PUBLICATIONS

Chinese Office Action dated Jul. 20, 2022, in corresponding CN Patent Application No. 202110260845.4, including English translation (15 pages).

Chinese Office Action dated Dec. 8, 2021, in corresponding CN Patent Application No. 202110260845.4, including English translation (19 pages).

Korean Office action dated Feb. 9, 2023 issued in corresponding KR Patent Application No. 10-2020-0029806, 5 pages.

Chinese Decision to Refuse dated Jan. 20, 2023 issued in corresponding CN Application No. 202110260845.4, with English translation, 14 pages.

* cited by examiner

INORGANIC PARTICLE COATING COMPOSITION INCLUDING BINDER, SILANE-BASED DISPERSANT, FATTY ACID, AND POLYMER POLYOL, METHOD FOR PREPARING SEPARATOR USING THE SAME, AND SEPARATOR AND LITHIUM BATTERY EMPLOYING THE SEPARATOR

CROSS-REFERENCE TO RELATED APPLICATION

This application claims priority to Korean Patent Application No. 10-2020-0029806, filed on Mar. 10, 2020, in the Korean Intellectual Property Office, the entire content of which is incorporated herein by reference.

BACKGROUND

1. Field

One or more aspects of embodiments of the present disclosure relate to a coating composition for a separator, a method for preparing a separator utilizing the same, a separator, and a lithium battery including the separator.

2. Description of the Related Art

In order to meet the trend toward compact, high-performance devices, it is important to manufacture lithium batteries that are small, lightweight, and have high energy density. In addition, the stability of lithium batteries under high-capacity, high-temperature, and/or high-voltage conditions has become an important factor for applications in electric vehicles and/or the like. To be suitable for these purposes and applications, there is a desire or demand for lithium batteries having a high discharge capacity per unit volume, high energy density, and/or excellent (e.g., long) life characteristics.

A separator is included in a lithium battery to prevent or reduce short circuits between a cathode and an anode. An electrode assembly, which includes a cathode, an anode, and a separator between the cathode and the anode, may be wound to have a jelly-roll configuration.

A separator having a coating slurry including inorganic particles (such as ceramic particles) and a binder, coated on one surface of a porous olefin-based polymer substrate, may be utilized as a separator for a jelly roll format lithium battery. In general, even for the same kind (e.g., a particular format) of inorganic particles, dispersion safety (e.g., a degree of dispersion that is desired to be high) of the inorganic particles in an organic solvent may vary depending on how the manufacturer and/or user performs milling and/or surface treatment.

Furthermore, the higher the amount or proportion of binder (e.g., polymer binder) in the coating slurry, the greater the particle size of the coating slurry material with the passage of a period of time that the coating slurry is left undisturbed. For example, even if the dispersion safety of inorganic particles is ensured, the greater the absolute amount of the binder (polymer binder) in the slurry solvent, the greater the risk of aggregation of the coating slurry due to external physical and/or chemical factors. In this case, because black spot defects may be produced after coating the separator, which may deteriorate the quality of product, it is desirable to secure the long-term storage stability of the coating slurry.

SUMMARY

One or more aspects of embodiments of the present disclosure are directed toward a coating composition for a separator having improved long-term storage stability, and therefore a reduced number of black spot defects produced after coating a porous substrate.

One or more aspects of embodiments of the present disclosure are directed toward a method of preparing a separator utilizing the coating composition.

One or more aspects of embodiments of the present disclosure are directed toward a separator including the coating composition.

One or more aspects of embodiments of the present disclosure are directed toward a lithium battery including the separator.

Additional aspects will be set forth in part in the description that follows and, in part, will be apparent from the description, or may be learned by practice of the presented embodiments of the disclosure.

One or more embodiments of the present disclosure provide a coating composition for a separator, the coating composition including:
inorganic particles, a binder, a silane-based dispersant, and a polymeric additive, wherein:
the silane-based dispersant includes (e.g., consists of) a silane-based compound having fewer than 8 carbons in an alkyl chain as a main chain (e.g., a silane-based compound including or having an alkyl main chain having fewer than 8 carbons, for example, 1 to 7 carbons), and
the polymeric additive includes a fatty acid compound and a polymeric polyol.

One or more embodiments of the present disclosure provide a method of preparing a separator, the method including:
coating the coating composition on one or both surfaces (e.g., sides) of a porous substrate; and
obtaining a separator having a coating layer disposed on the porous substrate by heat-blast drying the porous substrate having the coating composition coated thereon.

One or more embodiments of the present disclosure provide a separator including:
a porous substrate; and
the coating composition disposed on one or both surfaces of a porous substrate.

One or more embodiments of the present disclosure provide a lithium battery including: a cathode; an anode; and the separator disposed between the cathode and the anode.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
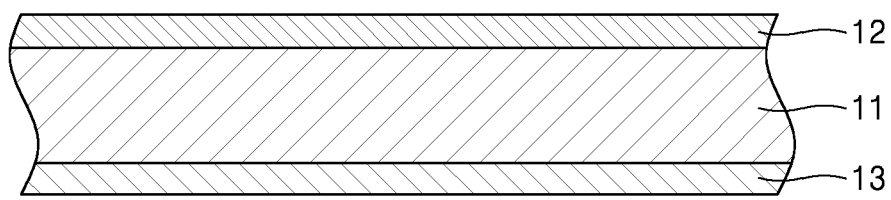
FIG. 1 is a schematic cross-sectional view of a composite separator according to an example embodiment.

Reference will now be made in more detail to embodiments, examples of which are illustrated in the accompanying drawings, wherein like reference numerals refer to like elements throughout, and duplicative descriptions thereof may not be provided. In this regard, the present embodiments may have different forms and should not be construed as being limited to the descriptions set forth herein. Accordingly, the embodiments are described with reference to the drawings merely to explain aspects of the present disclosure. As utilized herein, the term "and/or" includes any and all combinations of one or more of the associated listed items. Expressions such as "at least one of," "one of," and "selected from," when preceding a list of elements, modify the entire list of elements and do not modify the individual elements of the list.

Hereinafter, as the present disclosure allows for various suitable changes and numerous embodiments, selected embodiments will be illustrated in the drawings and described in more detail in the detailed description. However, this is not intended to limit the present disclosure to particular modes of practice, and it is to be appreciated that all changes, equivalents, and substitutes that do not depart from the spirit and technical scope are encompassed in the present disclosure.

The terms used herein are merely used to describe particular embodiments, and are not intended to limit the present disclosure. An expression used in the singular encompasses the expression of the plural, unless it has a clearly different meaning in the context. As used herein, it is to be understood that the terms such as "includes," "have," and "comprise" are intended to indicate the presence of the features, numbers, steps, actions, components, parts, ingredients, materials, or combinations thereof disclosed in the specification, but do not preclude the possibility that one or more other features, numbers, steps, actions, components, parts, ingredients, materials, or combinations thereof may exist or may be added. The symbol "/" used herein may be interpreted as "and" or "or" according to the context. Further, the use of "may" when describing embodiments of the present disclosure refers to "one or more embodiments of the present disclosure".

In the drawings, the diameters, lengths, and thicknesses of layers and regions may be exaggerated or reduced for clarity. Throughout the specification, it is to be understood that when a component, such as a layer, a film, a region, or a plate, is referred to as being "on" another component, the component can be directly on the other component or intervening components may be present thereon. When an element is referred to as being "directly on," no intervening elements are present. Throughout the specification, the terms "first," "second," etc. may be used to describe various elements, these elements, components, regions, layers and/or sections should not be limited by these terms. These terms are only used to distinguish one element from another element.

Hereinafter, a coating composition for a separator, a method for preparing a separator utilizing the same, a separator, and a lithium battery including the separator will be described in further detail.

A coating composition for a separator according to an embodiment includes:

inorganic particles, a binder, a silane-based dispersant, and a polymeric additive, wherein:
the silane-based dispersant includes (e.g., consists of) a silane-based compound having fewer than 8 carbons in an alkyl chain as a main chain (e.g., a silane-based compound including or having an alkyl main chain having fewer than 8 carbons, for example, 1 to 7 carbons), and
the polymeric additive includes a fatty acid compound and a polymer polyol.

The coating composition for the separator may be coated on one or both surfaces of the porous substrate to provide a separator having one or two coating layer(s) formed thereon, respectively. The coating compositional material for the separator may be more stable for long-term storage than coating material compositions in the related art, so that the aggregation of the coating composition may be inhibited or reduced even if the composition includes a higher content of binder, thereby minimizing or reducing the number of black spot defects produced on the separator after coating and improving the quality.

The coating composition includes the silane-based dispersant to aid in dispersion of the inorganic particles, and the silane-based dispersant may be or consist of a silane-based compound having fewer than 8 carbons in an alkyl chain as a main chain. A mixture or combination of a fatty acid compound and a polymer polyol may be utilized as the polymeric additive. The long-term storage stability of the composition may be secured via the combination of the silane-based dispersant and the polymeric additive, thereby reducing the number of black spot defects when the composition is coated to form a separator.

The silane-based dispersant may be or consist of a silane-based compound having fewer than 8 carbons (e.g., 1 to 7 carbons) in an alkyl chain as a main chain. As used herein, the term "main chain" may refer to the longest chain substituent on the silicon atom of the silane-based compound. The main chain of the silane-based compound may form one or more Van der Waals bonds with the binder in the coating composition, and functional groups substituted at the terminal carbon or to secondary carbons along the main chain may bond with the inorganic particles, thereby substantially uniformly connecting the binder with the inorganic particles (e.g., such that the silane-based compound forms a substantially uniform network including the binder and the inorganic particles). Accordingly, aggregation of the inorganic particles in the binder may be minimized or reduced, thereby minimizing or reducing the number of black spot defects produced after coating.

However, if the number of carbon atoms in the alkyl chain as the main chain of the silane-based compound is 8 or greater, severe or increased aggregation of the coating composition after or during long-term storage may occur, resulting in an increased number of black spot defects occurring after coating and thereby deteriorating the physical properties of the separator after coating. The number of carbons in the alkyl chain (e.g., main chain) of the silane-based compound may be, for example, 1 to 7, 2 to 6, or 3 to 5. For example, the silane-based compound may have a C1 to C7 alkyl chain, a C2 to C6 alkyl chain, or a C3 to C5 alkyl chain.

The silane-based compound may include, for example, at least one functional group selected from an alkoxy group, a halogen group, an amino group, a vinyl group, a glycidoxy group, a hydroxy group, a mercapto group, and an acyloxy group.

For example, the silane-based compound may include at least one selected from a vinyl alkyl alkoxysilane, an epoxy alkyl alkoxysilane, an amino alkyl alkoxysilane, a mercaptoalkyl alkoxysilane, a halogenated alkyl alkoxysilane, and an alkyl acyloxysilane.

An amount of the silane-based dispersant may be about 0.5 to about 1.5 parts by weight, based on 100 parts by weight of the inorganic particles. Within the above range, the inorganic particles may be effectively dispersed, and aggregation of the coating composition may be suppressed. An amount of the silane-based dispersant may be in a range of, for example, about 0.5 to about 0.8 parts by weight, about 0.8 to about 1.0 parts by weight, or about 1.0 to about 1.5 parts by weight, based on 100 parts by weight of the inorganic particles.

The coating composition includes a polymeric additive, and the polymeric additive includes a fatty acid compound and a polymer polyol. The polymeric additive may facilitate stable storage of the coating composition having a high-content binder for a long period of time.

The fatty acid compound may include a C15 to C30 unsaturated fatty acid compound, a C15 to C30 saturated fatty acid compound, or a combination thereof. The polymeric additive may include, for example, two or more types or kinds of fatty acid compounds (e.g., molecules). When two or more kinds of fatty acid compounds are utilized in combination, the dispersibility of the inorganic particles may be greatly improved, thereby further improving the long-term stability of the coating composition. In particular, fatty acid compounds having different numbers of carbons may be utilized in combination.

The term "fatty acid compound" may refer to a carboxylic compound including a saturated or unsaturated hydrocarbon chain substituted with a carboxy (—COON) group, where the fatty acid compound having a saturated hydrocarbon chain is referred to as a saturated fatty acid compound, and the fatty acid compound having an unsaturated hydrocarbon chain is referred to as an unsaturated fatty acid compound.

When the unsaturated fatty acid compound includes a double bond, for example, in the middle of an unbranched alkenyl chain, the two hydrocarbon groups on either side of the double bond may be positioned (pointing) in the same direction with respect to a vector normal to the double bond (cis isomer) or in opposite directions (trans isomer), with respect to a vector normal to the double bond.

The types or kinds of the fatty acid compound is not particularly limited, and the fatty acid compounds may each independently be selected from a C15 to C30 unsaturated fatty acid compound and a C15 to C30 saturated fatty acid compound.

In an example, the C15 to C30 unsaturated fatty acid compound may be selected from the group consisting of oleic acid ($C_{18}H_{34}O_2$), palmitoleic acid ($C_{16}H_{30}O_2$), cis-heptadecenoic acid ($C_{17}H_{32}O_2$), vaccenic acid ($C_{18}H_{34}O_2$), elaidic acid ($C_{18}H_{34}O_2$), linolenic acid ($C_{18}H_{32}O_2$), arachidonic acid ($C_{20}H_{32}O_2$), eicosenoic acid ($C_{20}H_{40}O_2$), erucic acid ($C_{22}H_{42}O_2$), eicosapentaenoic acid (EPA) ($C_{20}H_{30}O_2$), docosahexaenoic acid (DHA) ($C_{22}H_{32}O_2$), and nervonic acid ($C_{24}H_{46}O_2$).

In another example, the C15 to C30 saturated fatty acid compound may be selected from the group consisting of palmitic acid ($C_{16}H_{32}O_2$), stearic acid ($C_{18}H_{36}O_2$), arachidic acid ($C_{20}H_{40}O_2$), behenic acid ($C_{22}H_{44}O_2$), and lignoceric acid ($C_{24}H_{48}O_2$).

According to an embodiment, the coating composition may include a fatty acid compound including (e.g., consisting of) two or more types or kinds of unsaturated fatty acid compounds (only), two or more types or kinds of saturated fatty acid compounds (only), or a combination of a saturated fatty acid compound and an unsaturated fatty acid compound.

The coating composition may include two or more types or kinds of fatty acid compounds (e.g., molecules) having different numbers of carbons, for example, two or more different (e.g., unique) unsaturated fatty acid compounds. In the two or more different fatty acid compounds, all the fatty acid compounds contained in the coating composition may have different numbers of carbons, but it does not mean that all the fatty acid compounds necessarily each have a different number of carbons. For example, in a case in which the coating composition includes three or more fatty acid compounds, if two fatty acid compounds have a different number of carbons, the remaining fatty acid compounds may have the same number of carbons as one of the two fatty acid compounds. For example, the remaining fatty acid compounds may have the same number of carbons as one of the two fatty acid compounds, but may include a double bond at a different position or may have a different stereochemistry around the double bond (e.g., may be a positional, cis, or trans isomer of one of the two fatty acid compounds).

According to an embodiment, the fatty acid compound may be an unsaturated fatty acid compound including (e.g., a combination of two unsaturated fatty acid compounds including) oleic acid and nervonic acid.

According to an embodiment, the fatty acid compound may include various suitable combinations of unsaturated and saturated fatty acid compounds, for example including oleic acid, stearic acid, palmitic acid, and/or nervonic acid.

The term "oleic acid" may refer to a C18 unsaturated fatty acid compound represented by the chemical formula $C_{18}H_{34}O_2$, and it is a monounsaturated fatty acid having one double bond between two carbon atoms, and single bonds between the remaining carbon atoms.

The term "nervonic acid" may refer to a C24 unsaturated fatty acid, which is represented by a product of a chain reaction of an oleic acid, and may be a monounsaturated fatty acid including one double bond between carbon atoms and single bonds between the remaining carbon atoms, like the oleic acid.

The term "stearic acid" may refer to a C18 saturated fatty acid represented by the chemical formula $C_{18}H_{36}O_2$, and the term "palmitic acid" may refer to a C16 saturated fatty acid represented by the chemical formula $C_{16}H_{32}O_2$.

For example, the fatty acid compound may include a mixture of oleic acid and nervonic acid mixed in a weight ratio of (5 to 25):(5 to 25). Here, the notation (A to B):(C to D) indicates that the first component, e.g., oleic acid, may be provided in an amount ranging from A parts to B parts, and the second component, e.g., nervonic acid, may be provided in an amount ranging from C parts to D parts, and the resulting final weight ratio may range from A:D to B:C given that A<B and C<D. For example, the fatty acid compound may include a mixture of fatty acid compounds having oleic acid and nervonic acid in a weight ratio of about (5 to 15):(5 to 15) or about (9 to 10):(9 to 10). The coating composition including a mixture of fatty acid compounds may further improve the dispersibility of the inorganic particles, thereby improving long-term storage stability.

For example, the fatty acid compound may include a mixture of fatty acid compounds having oleic acid, stearic acid, palmitic acid, and nervonic acid in a weight ratio of about (5 to 25):(5 to 25):(5 to 25):(5 to 25). For example, the coating composition may include a mixture of oleic acid, stearic acid, palmitic acid, and nervonic acid in a weight ratio of about (5 to 15):(5 to 15):(5 to 15):(5 to 15):(5 to 15), or in a weight ratio of about (9 to 10):(9 to 10):(9 to 10):(8 to 9). The coating composition including a mixture of fatty acid compounds may further improve the dispersibility of the inorganic particles, and may thereby have improved long-term storage stability.

According to an embodiment, an acid value of the fatty acid compound may be about 20 to about 600 mg KOH/g, about 30 to about 500 mg-KOH/g, about 40 to about 400 mg-KOH/g, or about 50 to about 300 mg-KOH/g. The term "acid value" is a value indicating the amount of fatty acid contained in 1 g of an oil or petroleum product, and may be generally defined as an amount (in mg) of potassium hydroxide (KOH) required to neutralize 1 g of the oil or petroleum product. When the fatty acid compound has an acid value less (lower) than the above ranges, the inorganic particles may not be properly dispersed, and when the fatty acid compound has an acid value greater than the above ranges, aggregation of the fatty acid compound may occur, resulting in deterioration of dispersibility. Therefore, the coating composition may suitably utilize the fatty acid compound having an acid value in the above ranges.

The polymer polyol may have a number average molecular weight in a range of about 500 to about 5000, and may be a polymer polyol not having an alicyclic structure. The polymer polyol having a number average molecular weight in the range of about 500 to about 5000 and not having an alicyclic structure is not particularly limited, and non-limiting examples thereof may include polycarbonate polyol, polyester polyol, polyether polyol, poly(meth)acryl polyol, and/or polydiene polyol.

The polycarbonate polyol is not particularly limited, and non-limiting examples thereof may include a polycarbonate polyol obtained by reacting a polyol not having an alicyclic structure in its main chain with a carbonate compound. Non-limiting examples of the polyol not having an alicyclic structure in its main chain may include 1,6-hexanediol, 1,5-pentanediol, 2-ethyl-1,6-hexanediol, 1,4-butanediol, 1,9-nonanediol, 3-methyl-1,5-pentanediol, 2-methyl-1,8-octanediol, diethylene glycol, triethylene glycol, tetraethylene glycol, and/or 1,4-benzene dimethanol. The polyol not having an alicyclic structure in its main chain may be utilized singly or in a combination of two or more.

The carbonate compound is not particularly limited, and non-limiting examples thereof may include: an aliphatic carbonate compound (such as dimethyl carbonate or diethyl carbonate); an aromatic carbonate compound (such as diphenyl carbonate); and a cyclic carbonate compound (such as ethylene carbonate). In some embodiments, a phosgene capable of producing the same polycarbonate polyol may also be utilized. For example, in terms of easy manufacturability of the polycarbonate polyol, an aliphatic carbonate compound, for example, dimethyl carbonate, may be used.

The polyester polyol is not particularly limited, and non-limiting examples thereof may include polyethylene adipate polyol, polybutylene adipate polyol, polyethylene butylene adipate polyol, polyhexamethylene isophthalate adipate polyol, polyethylene succinate polyol, polybutylene succinate polyol, polyethylene sebacate polyol, polybutylene sebacate polyol, poly-ε-caprolactone polyol, and/or poly(3-methyl-1,5-pentylene adipate) polyol.

The polyether polyol is not particularly limited, and non-limiting examples thereof may include polyethylene glycol, polypropylene glycol, polytetramethylene glycol, a random or block copolymer of ethylene oxide and propylene oxide, and/or a random or block copolymer of ethylene oxide and butylene oxide.

In some embodiments, a polyether polyester polyol having an ether bond and an ester bond (e.g., simultaneously) may also be utilized.

The poly(meth)acryl polyol is not particularly limited, and non-limiting examples thereof may include a homopolymer and/or a copolymer of (meth)acrylic ester having a hydroxy group.

The poly(meth)acryl polyol may also be a copolymer obtained by copolymerizing a compound having a polymerizable unsaturated bond, in addition to a (meth)acrylic ester having a hydroxy group.

Non-limiting examples of the (meth)acrylic acid ester having a hydroxy group may include a hydroxy(meth) acrylic ester such as 2-hydroxyethyl acrylate, 2-hydroxypropyl acrylate, 2-hydroxybutyl acrylate, 3-hydroxypropyl (meth)acrylate, 4-hydroxybutyl (meth)acrylate, a (meth) acrylic acid monoester of glycerin, and/or a(meth)acrylic acid monoester of trimethylol propane.

Non-limiting examples of the compound having a polymerizable unsaturated bond may include: a (meth)acrylic acid ester, (such as methyl (meth)acrylate, ethyl (meth)acrylate, isopropyl (meth)acrylate, n-butyl (meth)acrylate, isobutyl (meth)acrylate, n-hexyl (meth)acrylate, lauryl (meth)acrylate, glycidyl (meth)acrylate, and/or 2-ethylhexyl (meth) acrylate); an unsaturated carboxylic acid, (such as maleic acid and/or itaconic acid); an unsaturated amide (such as acrylamide, N-methylol amide, and/or a diacetone acrylamide); and/or one or more other polymerizable monomers, (such as styrene, vinyl toluene, vinyl acetate, acrylonitrile, and/or dibutyl fumarate).

Non-limiting examples of the polymerization method of the (meth)acrylic ester having a hydroxy group and/or the compound having a polymerizable unsaturated bond may include emulsion polymerization, suspension polymerization, dispersion polymerization, solution polymerization, and/or so on. The emulsion polymerization may be gradual and/or may be performed step by step.

The polydiene polyol is not limited, and may include a unit induced (e.g., introduced) from butadiene, isoprene, 1,3-pentadiene, chloroprene, or cyclopentadiene.

The polymer polyol may be utilized singly or in a combination of two or more.

The polymer polyol may have a number average molecular weight in a range of about 500 to about 5000, for example, about 500 to about 3000. When the polymer polyol has a number average molecular weight in the above ranges, the long-term storage stability of the coating composition may be further improved.

In terms of the long-term storage stability of the coating composition, and the effect of reducing the number of black spot defects produced on a separator coated with the coating composition, polyether polyol may be utilized as the polymer polyol. The polyether polyol may include, for example, a polyethylene glycol, a polypropylene glycol, a polytetramethylene glycol, a random or block copolymer of ethylene oxide and propylene oxide, and/or a random or block copolymer of ethylene oxide and butylene oxide.

An amount of the polymeric additive contained in the coating composition may be about 1 to about 20 parts by weight, for example, about 2 to about 10 parts by weight, about 3 to about 6 parts by weight, or about 4 to about 5 parts by weight, based on 100 parts by weight of the inorganic particles. Within the above ranges, the long-term storage stability of the coating composition may be improved.

A weight ratio of the fatty acid compound and the polymer polyol may be about 1:0.1 to about 1:2, for example, about 1:0.2 to about 1:1.5, about 1:0.3 to about 1:1, about 1:0.3 to about 1:0.7, or about 1:0.8 to about 1:1. Within the above ranges, the long-term storage stability of the coating composition may be improved.

The binder contained in the coating composition may include, for example, one or more selected from polyvinylidene fluoride, polyvinylidene fluoride-hexafluoropropylene copolymer, polyvinylidene fluoride-trichloroethylene copolymer, polyvinylidene fluoride-chlorotrifluoroethylene copolymer, polymethylmethacrylate, polyacrylonitrile, polyvinylpyrrolidone, polyvinyl acetate, ethylene vinyl acetate copolymer, polyethylene oxide, cellulose acetate, cellulose acetate butylate, cellulose acetate propionate, cyanoethyl pullulan, cyanoethyl polyvinyl alcohol, cyanoethyl cellulose, cyanoethyl sucrose, pullulan, carboxylmethyl cellulose, acrylonitrile styrene butadiene copolymer, and polyimide.

The coating composition may include a fluorine-based binder. The fluorine-based binder may be a binder in which some or all of the hydrogens connected to carbons are substituted by fluorine. For example, the fluorine-based binder may be a polymer including a repeating unit derived from one or more monomers selected from fluorovinylidene monomer, tetrafluoroethylene monomer, and hexafluoropropylene. The fluorine-based binder may be, for example, a fluorine-based homopolymer or a fluorine-based copolymer.

The fluorine-based binder contained in the coating composition may include, for example, copolymers of a tetrafluoroethylene monomer and other monomers. An example monomer utilized (e.g., copolymerized) with the tetrafluoroethylene monomer may be or include one or more fluorine-containing monomers selected from the group consisting of vinylidene fluoride, hexafluoropropylene, chlorotrifluoroethylene, and perfluoroalkyl vinyl ether. The fluorine-based binder may be, for example, tetrafluoroethylene-vinylidene fluoride copolymer, tetrafluoroethylene-hexafluoropropylene copolymer, tetrafluoroethylene-chlorotrifluoroethylene copolymer, and/or tetrafluoroethylene-perfluoroalkyl vinyl ether. An amount of the tetrafluoroethylene monomer contained in the fluorine-based binder may be, for example, about 10 mol % or greater, about 30 mol % or greater, about 50 mol % or greater, about 70 mol % or greater, or about 90 mol % or greater based on one mole of the polymer or the copolymer. In another embodiment, the fluorine-based binder contained in the coating composition may include, for example, copolymers of a vinylidene fluoride monomer and other monomers. The fluorine-based binder may include, for example, copolymers of a vinylidene fluoride monomer and one or more fluorine-containing monomers selected from the group consisting of hexafluoropropylene, chlorotrifluoroethylene, fluorovinyl, and perfluoroalkylvinyl ether. For example, the vinylidene-based monomer may be a vinylidene fluoride homopolymer, a vinylidene fluoride-hexafluoropropylene copolymer, and/or a vinylidene fluoride-chlorotrifluoroethylene copolymer. An amount of the vinylidene fluoride-based monomer contained in the fluorine-based binder may be, for example, about 50 mol % or greater, about 60 mol % or greater, about 70 mol % or greater, about 80 mol % or greater, or about 90 mol % or greater.

Non-limiting examples of the fluorine-based binder contained in the coating composition may include polyvinylidene fluoride, a polyvinylidene fluoride-hexafluoropropylene copolymer, a polyvinylidene fluoride-trichloroethylene copolymer, a polyvinylidene fluoride-chlorotrifluoroethylene copolymer, and/or polytetrafluoroethylene. The fluorine-based binder contained in the coating composition may be, for example, a vinylidene fluoride-hexafluoropropylene copolymer. A glass transition temperature of the vinylidene fluoride-hexafluoropropylene copolymer contained in the coating composition may be about −10° C. or less, and a melting point thereof may be about 150° C. or greater.

A glass transition temperature of the vinylidene fluoride-hexafluoropropylene copolymer contained in the coating composition may be, for example, about −10° C. or less, about −15° C. or less, about −20° C. or less, or about −25° C. or less. The glass transition temperature of the vinylidene fluoride-hexafluoropropylene copolymer may be, for example, about −80° C. or greater, about −60° C. or greater, about −50° C. or greater, or about −40° C. or greater. The glass transition temperature of the vinylidene fluoride-hexafluoropropylene copolymer may be in a range of, for example, about −80° C. to about −10° C., about −60° C. to about −15° C., about −50° C. to about −40° C., or about −40° C. to about −25° C. When the glass transition temperature of the vinylidene fluoride-hexafluoropropylene copolymer is extremely (e.g., unsuitably) low, crystallinity of the copolymer may be reduced, increasing swelling with respect to an electrolytic solution, and thereby lowering a bending strength of the separator. When the glass transition temperature of the vinylidene fluoride-hexafluoropropylene copolymer is extremely (e.g., unsuitably) high, crystallinity of the copolymer may be increased, resulting in negligible swelling with respect to an electrolytic solution, thereby lowering a bending strength of the separator.

A melting point of the vinylidene fluoride-hexafluoropropylene copolymer contained in the coating composition may be, for example, about 100° C. or greater, about 120° C. or greater, about 130° C. or greater, or about 140° C. or greater. The melting point of the vinylidene fluoride-hexafluoropropylene copolymer may be, for example, about 200° C. or less, about 190° C. or less, about 180° C. or less, or about 170° C. or less. The melting point of the vinylidene fluoride-hexafluoropropylene copolymer may be in a range of, for example, about 100° C. to about 200° C., about 120° C. to about 190° C., about 130° C. to about 180° C., or about 140° C. to about 170° C. When the melting point of the vinylidene fluoride-hexafluoropropylene copolymer is extremely (e.g., unsuitably) low, crystallinity of the copolymer may be reduced, increasing swelling with respect to an electrolytic solution, thereby lowering the bending strength. When the melting point of the vinylidene fluoride-hexafluoropropylene copolymer is extremely (e.g., unsuitably) high, crystallinity of the copolymer may be increased, resulting in negligible swelling with respect to an electrolytic solution, thereby lowering the bending strength.

An amount of hexafluoropropylene in the vinylidene fluoride-hexafluoropropylene copolymer contained in the coating composition may be, for example, about 1 mol % or greater, about 3 mol % or greater, or about 5 mol % or greater based on one mole of the copolymer. An amount of hexafluoropropylene contained in the vinylidene fluoride-hexafluoropropylene copolymer may be, for example, about 20 mol % or less, about 17 mol % or less, or about 15 mol % or less based on one mole of the copolymer. The amount of hexafluoropropylene contained in the vinylidene fluoride-hexafluoropropylene copolymer may be, for example, about 1-mol %, about 3-17 mol %, or about 5-15 mol %. When the amount of hexafluoropropylene is extremely (e.g., unsuitably) low, crystallinity of the copolymer may be increased, resulting in negligible swelling with respect to an electrolytic solution, thereby lowering the bending strength. When the amount of hexafluoropropylene is extremely (e.g., unsuitably) high, crystallinity of the copolymer may be significantly reduced, excessively increasing swelling with respect to an electrolytic solution, thereby lowering the bending strength.

The fluorine-based binder contained in the coating composition may include, for example, a hydrophilic group. The fluorine-based binder contained in the coating composition may further include, but is not limited to, one or more hydrophilic functional groups selected from the group including (e.g., consisting of) a carboxylic acid group, a sulfonic acid group, a phosphoric acid group, an acid anhydride group, a hydroxy group, and salts thereof, and any hydrophilic functional group that can be utilized in the art may be suitably utilized.

For example, introduction of a polar functional group to the fluoride-based binder may be performed by adding a monomer including a carboxylic acid group, a sulfonic acid group, a phosphoric acid group, an acid anhydride group, a hydroxy group, or a salt thereof, to a fluorine-containing mixture, followed by performing polymerization.

Non-limiting examples of the monomer including a carboxylic acid group may include a monocarboxylic acid and derivatives thereof, and/or dicarboxylic acid and derivatives thereof. Non-limiting examples of the monocarboxylic acid may include an acrylic acid, a methacrylic acid, and/or a crotonic acid. Non-limiting examples of the monocarboxylic acid derivative may include a 2-ethyl acrylic acid, an isocrotonic acid, an α-acetoxy acrylic acid, a β-trans-aryloxyacrylic acid, an α-chloro-β-E-methoxy acrylic acid, and/or a β-diaminoacrylic acid. Non-limiting examples of the dicarboxylic acid may include a maleic acid, a fumaric acid, and/or an itaconic acid. Non-limiting examples of the derivative of a dicarboxylic acid may include methyl maleic acid, dimethyl maleic acid, a phenyl maleic acid, chloro maleic acid, dichloro maleic acid, or fluoromaleic acid; and/or a maleic acid ester (such as diphenyl maleate, nonyl maleate, decyl maleate, dodecyl maleate, octadecyl maleate, and/or a fluoroalkyl maleate). An acid anhydride that produces a carboxylic acid by hydrolysis may also be utilized. Non-limiting examples of the acid anhydride may include an maleic anhydride, an acrylic anhydride, a methyl maleic anhydride, and/or a dimethyl maleic anhydride. Also, a monoester and a diester of α,β-ethylenically unsaturated polyvalent carboxylic acid, (such as a monoethyl maleate, diethyl maleate, monobutyl maleate, dibutyl maleate, monoethyl fumareate, diethyl fumareate, monobutyl fumareate, dibutyl fumareate, monocyclohexyl fumareate, dicyclohexyl fumareate, monoethyl itaconate, diethyl itaconate, monobutyl itaconate, and/or dibutyl itaconate), may be further utilized. Non-limiting examples of a monomer having a sulfonic acid group may include a vinyl sulfonic acid, a methyl vinyl sulfonic acid, a (meth)allyl sulfonic acid, a styrene sulfonic acid, a (meth)acrylic acid-2-ethyl sulfonic acid, a 2-acrylamid-2-methylpropane sulfonic acid, and/or a 3-allyloxy-2-hydroxypropane sulfonic acid. Non-limiting examples of a monomer having a phosphoric acid group may include phosphate 2-(meth)acryloyloxyethyl, phosphoric acid methyl-2-(meth)acryloyloxyethyl, and/or phosphoric acid ethyl-(meth)acryloyloxyethyl. Non-limiting examples of a monomer having a hydroxyl group may include an ethylenically unsaturated alcohol, (such as (meth) allylalcohol, 3-butene-1-ol, and/or 5-hexene-1-ol); alkanolesters of an ethylenically unsaturated carboxylic acid (such as acrylic acid-2-hydroxyethyl, acrylic acid-2-hydroxypropyl, methacrylic acid-2-hydroxyethyl, methacrylic acid-2-hydroxypropyl, maleic acid di(2-hydroxy)ethyl, maleic acid di(4-hydroxy)butyl, or itaconic acid di(2-hydroxy)propyl); an ester of polyalkylene glycol and (meth)acrylic acid represented by $CH_2=CR^1-COO-(C_nH_{2n}O)_m-H$ (where m indicates an integer of 2 to 9, n indicates an integer of 2 to 4, and $R^1$ indicates a hydrogen or a methyl group); a mono(meth)ester acrylic acid of a dihydroxyester of a dicarboxylic acid, (such as 2-hydroxyethyl-2'-(meth)acryloyloxy phthalate, and/or 2-hydroxyethyl-2'-(meth)acryloyloxy succinate); a vinylether, (such as 2-hydroxyethylvinyl ether and/or 2-hydroxypropylvinyl ether); a mono(meth)allyl ether of alkylene glycol (such as (meth)allyl-2-hydroxyethyl ether, (meth)allyl-2-hydroxypropyl ether, (meth)allyl-3-hydroxypropyl ether, (meth)allyl-2-hydroxybutyl ether, (meth) allyl-3-hydroxybutyl ether, (meth)allyl-4-hydroxybutyl ether, and/or (meth)allyl-6-hydroxyhexyl ether); a polyoxy alkylene glycol(meth)monoallyl ether (such as diethylene glycol mono(meth)allyl ether and/or dipropylene glycolmono(meth)allylether); a mono(meth)allyl ether of a halogen- and hydroxy-substituted (poly)alkylene glycol, (such as glycerin mono(meth)allyl ether, (meth)allyl-2-chloro-3-hydroxypropyl ether, and/or (meth)allyl-2-hydroxy-3-chloropropyl ether); a mono(meth)allyl ether of polyphenol (such as eugenol and/or isoeugenol), and halogenated derivatives thereof; and/or one or more (meth)allyl thioethers of alkylene glycol (such as (meth)allyl-2-hydroxyethyl thioether and/or (meth)allyl-2-hydroxypropyl thioether). From among these, in consideration of binding strength to an electrode active material, the hydrophilic group may be a carboxylic acid group or a sulfonic acid group. For example, in consideration of high efficiency capture of transition metal ions eluted from a cathode active material layer, a carboxylic acid group may be utilized as the hydrophilic group.

In some embodiments, the vinylidene fluoride-hexafluoropropylene copolymer contained in the coating composition may include, a hydrophilic group. By including the hydrophilic group, the vinylidene fluoride-hexafluoropropylene copolymer may strongly bind with an active material present on the surface of an electrode or a binder component in the electrode, by, for example, a hydrogen bond. The hydrophilic group included in the vinylidene fluoride-hexafluoropropylene copolymer may be a hydroxyl group, a carboxyl group, a sulfonic acid group, or a salt thereof. For example, the hydrophilic group included in the vinylidene fluoride-hexafluoropropylene copolymer may be a carboxyl (—COON) group, or a carboxylic ester group. For example, when manufacturing the vinylidene fluoride-hexafluoropropylene copolymer, the hydrophilic group may be introduced to a main chain by copolymerizing with the monomer having a hydrophilic group (such as maleic anhydride, maleic acid, maleate, and/or monomethyl maleate), or the hydrophilic group may be introduced to a side chain by grafting. The amount of hydrophilic group may be measured by FT-IR, NMR, and/or titration. For example, in a case of carboxylic acid group, the amount of hydrophilic group may be obtained, by FT-IR, from an absorbance intensity ratio of C=O stretching vibration to C—H stretching vibration of carboxyl group, on the basis of homopolymers. The amount of hydrophilic groups contained in the vinylidene fluoride-hexafluoropropylene copolymer may be, for example, about 0.1 mol % or greater, about 0.2 mol % or greater, or about 0.3 mol % or greater based on one mole of the copolymer. The amount of hydrophilic groups contained in the vinylidene fluoride-hexafluoropropylene copolymer may be, for example, about 5 mol % or less, about 3 mol % or less, or about 1 mol % or less based on one mole of the copolymer. The amount of hydrophilic groups contained in the vinylidene fluoride-hexafluoropropylene copolymer may be in a range of, for example, about 0.1 to about 3 mol %, about 0.2 to about 2 mol %, or about 0.3 to about 1 mol %. When the amount of the hydrophilic groups is extremely (e.g., unsuitably) low, crystallinity of the copolymer may be increased, resulting in negligible swelling with respect to an electrolytic solution, thereby lowering bending strength. When the amount of the hydrophilic groups is extremely (e.g., unsuitably) high, crystallinity of the copolymer may be significantly reduced, resulting in increased swelling with respect to an electrolytic solution, thereby lowering bending strength.

A weight average molecular weight of the vinylidene fluoride-hexafluoropropylene copolymer contained in the coating composition may be in a range of, for example, about 500,000 to about 1,200,000 Dalton, about 700,000 to about 1,200,000 Dalton, about 750,000 to about 1,150,000 Dalton, or about 800,000 to about 1,000,000 Dalton. When the weight average molecular weight is within the above ranges, a time utilized to dissolve the vinylidene fluoride-hexafluoropropylene copolymer in a solvent may be reduced, thereby improving manufacturing efficiency. In some embodiments, when the weight average molecular weight is within the above ranges, the vinylidene fluoride-hexafluoropropylene copolymer may maintain a set or predetermined strength of gel after the vinylidene fluoride-hexafluoropropylene copolymer swells in an electrolytic solution, and the bending strength of the copolymer may be improved. Throughout the present specification, the weight average molecular weight is a calculation result with respect to polystyrene standard obtained by gel permeation chromatography.

Because the inorganic particles of coating composition are contained in the coating layer of the separator, a probability of a short circuit occurring between a cathode and an anode may be reduced, thereby improving the stability of battery. The inorganic particles contained in the coating composition may include a metal oxide, a metalloid oxide, a metal sulfide, a metal carbonate, a metal phosphate, a metal fluoride, a metal sulfide, or a combination thereof. For example, non-limiting examples of the inorganic particles may include alumina, titania, boehmite, barium sulfate, calcium carbonate, calcium phosphate, amorphous silica, crystalline glass particles, kaolin, talc, silica-alumina composite oxide particles, calcium fluoride, lithium fluoride, zeolite, molybdenum sulfide, mica, and/or magnesium oxide. Non-limiting examples of the inorganic particles may include $Al_2O_3$, $SiO_2$, $TiO_2$, $SnO_2$, $CeO_2$, NiO, CaO, ZnO, MgO, $ZrO_2$, $Y_2O_3$, $SrTiO_3$, $BaTiO_3$, $MgF_2$, $Mg(OH)_2$, or a combination thereof. In consideration of crystal growth and/or economic efficiency of the vinylidene fluoride-hexafluoropropylene copolymer, the inorganic particles may include alumina, titania, boehmite, barium sulfate, or a combination thereof. The inorganic particles may have any suitable shape utilized in the art, for example, of spheres, plates, and/or fibers, but is not limited to. The plate-shaped inorganic particles may include, for example, alumina, boehmite, etc. In such a case, a reduction in the area of a separator at a high temperature may be further inhibited, a relatively large porosity may be secured, and a lithium battery may be evaluated to have an improved penetration characteristic. When the inorganic particles have plate and/or fiber shapes, an aspect ratio of the inorganic particles may be about 1:5 to about 1:100. For example, the aspect ratio may be about 1:10 to about 1:100. For example, the aspect ratio may be about 1:5 to about 1:50. For example, the aspect ratio may be about 1:10 to about 1:50. A ratio of a length ratio of a major axis to a minor axis on a planar surface of the plate-shaped inorganic particles may be about 1 to about 3. The length ratio of the major axis to the minor axis on a planar surface may be, for example, about 1 to about 2. For example, the length ratio of the major axis to the minor axis on a planar surface may be about 1. The aspect ratio and the length ratio of the major axis to the minor axis may be calculated by, for example, a scanning electron microscope (SEM) observation. Within the ranges of the aspect ratio and the length ratio of the major axis to the minor axis, shrinkage of a separator may be inhibited, relatively improved porosity may be secured, and/or the penetration property of lithium battery may be improved. When the inorganic particles are plate-shaped, an average angle of the planar surface of the inorganic particles relative to one surface of a porous substrate may be about 0 to about 30 degrees. An angle of the planar surface of the inorganic particles relative to one surface of the porous substrate may be about 0 degrees. For example, the one surface of the porous substrate and the planar surface of the inorganic particles may be parallel with each other. For example, when the average angle of the planar surface of the inorganic particles relative to the one surface of the porous substrate is within the above range, thermal shrinkage of the porous substrate may be effectively prevented or reduced, thereby providing a separator having a reduced shrinkage ratio. The organic particles may be a cross-linked polymer.

In the coating composition, a weight ratio of the inorganic particles and the binder may be about 40:60 to about 80:20. For example, the weight ratio of the inorganic particles and the binder may be about 50:50 to about 70:30, or about 60:40 to about 65:35. Within the above ranges, a coating composition having high long-term storage stability while including a high-content binder may be provided.

The coating composition may further include organic particles. Non-limiting examples of the organic particles may include, but are not limited to, a styrene-based compound and derivatives thereof, a methyl methacrylate based compound and derivatives thereof, an acrylate based compound and derivatives thereof, a diallyl phthalate based compound and derivatives thereof, a polyimide based compound and derivatives thereof, a polyurethane based compound and derivatives thereof, copolymers of these compounds, or combinations thereof, and any organic particles utilized in the art may be suitably utilized. For example, the organic particles may be or include crosslinked polystyrene particles and/or crosslinked polymethylmethacrylate. In some embodiments, the particles may be secondary particles produced by aggregation of primary particles. In the separator including the secondary particles, a porosity of a coating layer formed on the separator may be increased, thereby providing a lithium battery having an excellent high-output property. The organic particles may be a highly cross-linked polymer, a glass transition temperature (Tg) of which does not appear (e.g., having a Tg that is sufficiently high so that it is not observed). When the highly cross-linked polymer is utilized, heat resistance may be improved, and thus shrinkage of the porous substrate at a high temperature may be effectively suppressed.

The coating composition may further include an organic solvent capable of dissolving the above-described components, prior to coating of the separator, and thus may be provided in the form of a slurry. The organic solvent may be volatilized by drying after coating the coating composition, so that the organic solvent may not be present on the coating layer of the finally obtained separator. For example, N-methylpyrrolidone and/or acetone may be utilized as the organic solvent, but is not limited thereto, and any solvent that can be utilized in the art may be suitably utilized. Acetone, for example, may be utilized as the organic solvent. In some embodiments, the coating composition may further or alternatively include water.

A method of preparing a separator according to an embodiment may include: coating the coating composition on one or both surfaces of a porous substrate; and heat-blast drying the porous substrate coated with the coating composition to obtain the separator having a coating layer disposed on the porous substrate First, a coating composition is coated on one or both surfaces of a porous substrate while moving the porous substrate.

A method of coating the coating composition on one and both surfaces of the moving porous substrate is not particularly limited, and non-limiting examples of the method may include, but are not limited to, one or more selected from forward roll coating, reverse roll coating, microgravure coating, and direct metering coating. The coating method may be, for example, direct metering coating.

Next, the porous substrate coated with the coating composition is transferred to a drier.

As the porous substrate coated with the coating composition is dried with heat blast in the drier, the separator having a coating layer disposed on the porous substrate is prepared. The porous substrate coated with the coating composition may be supplied to one side of the drier to then be dried with a heat blast in the drier, and then discharged to the other side of the drier. The heat blast may be supplied from upper nozzles and lower nozzles in the drier, which may be alternatingly or symmetrically disposed at top and bottom portions of (e.g., above and/or below) the porous substrate coated with the coating composition.

The porous substrate may be moved in the drier at a speed of, for example, about 0.15 m/s to about 0.45 m/s, about 0.15 m/s to about 0.40 m/s, or about 0.15 m/s to about 0.35 m/s. When the moving speed of the porous substrate is extremely (e.g., unsuitably) low, a binding force between the coating layer and the porous substrate may be lowered because the inorganic particles contained in the coating composition are mainly distributed at an interface between the coating layer and the porous substrate. When the moving speed of the porous substrate is extremely (e.g., unsuitably) high, a binding force between a separator and an electrode may be lowered because the inorganic particles contained in the coating composition are mainly distributed around a surface of the coating layer facing the electrode.

The speed of supplying the heat blast in the drier may be in a range of, for example, about 10 to about 50 m/s, about 10 to about 40 m/s, about 10 to about 30 m/s, or about 10 to about 20 m/s. By having the heat blast supply speed within the above ranges, the separator having improved bending strength and peel strength may be prepared. When the heat blast supply speed is extremely (e.g., unsuitably) low, a binding force between the coating layer and the porous substrate may be lowered because the inorganic particles contained in the coating composition are mainly distributed at an interface between the coating layer and the porous substrate. When the heat blast supply speed is extremely (e.g., unsuitably) high, a binding force between the composite separator and the electrode may be lowered because the inorganic particles contained in the coating layer are mainly distributed around a surface of the coating layer facing the electrode.

A heat-blast drying temperature in the drier may be in a range of, for example, about 30° C. to about 80° C., about 35° C. to about 75° C., about 40° C. to about 70° C., or about 45° C. to about 65° C. By having the heat-blast drying temperature within the above ranges, the separator having improved bending strength and peel strength may be prepared. When the heat-blast drying temperature is extremely (e.g., unsuitably) low, drying may be incompletely performed. When the heat-blast drying temperature is extremely (e.g., unsuitably) high, a substantially uniform coating layer structure may not be obtained due to rapid volatilization of solvent.

A residence time of the porous substrate in the drier may be in a range of, for example, about 10 to about 50 seconds, about 10 to about 45 seconds, about 10 to about 40 seconds, about 10 to about 35 seconds, or about 10 to about 30 seconds. By having the residence time within the above ranges, a separator having improved bending strength and peel strength may be prepared. When the residence time of the porous substrate in the drier is extremely (e.g., unsuitably) short, phase separation may not be uniformly achieved. When the residence time of the porous substrate in the drier is extremely (e.g., unsuitably) long, a base film may shrink, and pores of the entire film may be reduced.

A non-solvent supplied in the drier during the heat-blast drying may be one or more selected from water and an alcohol. As used herein, the term "non-solvent" refers to a liquid or solvent that is not capable of appreciably dissolving the material it is applied to, for example, the separator. The non-solvent may be, for example, water (e.g., water vapor). The alcohol may be, for example, methanol, ethanol, and/or propanol.

A separator according to another embodiment includes: a porous substrate; and a coating layer disposed on one or both surfaces of the porous substrate, wherein the coating layer includes the above-described coating composition.

The separator including the coating layer prepared from the coating composition may have fewer than about 0.04 black spots counted per unit area (1 $m^2$), suggesting that the separator has superb or suitable physical properties. In some embodiments, the number of black spots counted per unit area (1 $m^2$) of the separator may be about 0.03 or less, about 0.02 or less, or about 0.01 or less.

A bending strength of an electrode assembly including the separator disposed between a cathode and an anode and wound in a jelly-roll assembly may be 460 N or greater, and a peel strength thereof may be 0.3 N/m or greater. Because the separator has a bending strength of 460 N or greater and a peel strength of 0.3 N/m or greater, a lithium battery including the separator may have improved energy density and/or cycle characteristics.

A porous substrate included in the separator may be a porous film including a polyolefin. Polyolefin has a good short-circuit prevention or reduction effects and may improve battery stability owing to a shut-down effect thereof. For example, the porous substrate may be a film made of a resin including, but not limited to, polyolefin, (such as polyethylene, polypropylene, polybutene, or polyvinyl chloride, or a mixture or copolymer thereof), and any porous film utilized in the art may be suitably utilized. For example, the porous substrate may include: a porous film including a polyolefin-based resin; a porous film having a polyolefin-based fiber in a woven form; a non-woven fabric including polyolefin; and/or an aggregate of insulating material particles. For example, the porous film including polyolefin may have excellent coatability of a binder solution for forming a coating layer formed on the porous substrate, and may increase a capacity per unit volume by increasing a proportion of an active material in a battery by reducing a film thickness of the separator.

The polyolefin utilized as a material of the porous substrate may be, for example, a homopolymer of polyethylene or polypropylene, or a copolymer or mixture thereof. The polyethylene may be a low-density polyethylene, an intermediate-density polyethylene, or a high-density polyethylene, and the high-density polyethylene may provide suitable mechanical strength. In some embodiments, in order to impart flexibility, a mixture of two or more kinds of polyethylenes may be utilized. A polymerization catalyst utilized in preparing polyethylene is not particularly limited, and for example a Ziegler-Natta catalyst, a Phillips catalyst, and/or a metallocene-based catalyst may be utilized. In order to achieve both mechanical strength and high penetration efficiency (e.g., simultaneously), a weight average molecular weight of polyethylene may be about 100,000 to about 12,000,000, for example, about 200,000 to about 3,000,000. The polypropylene may be a homopolymer, a random copolymer, or a block copolymer, which may be utilized singly or in combination of two or more. In some embodiments, the polymerization catalyst is not particularly limited, and a Ziegler-Natta catalyst or a metallocene-based catalyst may be utilized. In some embodiments, the stereoregularity of the polypropylene is not particularly limited, and isotactic, syndiotactic, and/or atactic polypropylene may be utilized. For example, isotactic polypropylene (which is inexpensive) may be utilized. Further, other polyolefins, (e.g., other than polyethylene or polypropylene), and additives (such as an antioxidant) may be added within the above-described ranges.

For example, the polyolefin, (such as polyethylene, polypropylene, and/or the like), may be utilized as the porous substrate of the separator, and multiple layers (e.g., more than two layers) may be utilized for the porous substrate of the separator. In some embodiments, the separator may be formed to have a mixed multilayer structure, (such as a polyethylene/polypropylene two-layered separator, a polyethylene/polypropylene/polyethylene three-layered separator, and/or a polypropylene/polyethylene/polypropylene three-layered separator), but is not limited thereto, and any material and/or structure utilized as a porous substrate in the art may be suitably utilized. The porous substrate of the separator may include, for example, a diene-based polymer prepared by polymerizing a monomer composition including a diene-based monomer. The diene-based monomer may be a conjugated diene-based monomer or a non-conjugated diene-based monomer. Non-limiting examples of the diene-based monomer may include, but are not limited to, 1,3-butadiene, isoprene, 2-chloro-1,3-butadiene, 2,3-dimethyl-1,3-butadiene, 2-ethyl-1,3-butadiene, 1,3-pentadiene, chloroprene, vinyl norbornene, dicyclopentadiene, and/or 1,4-hexadiene, and any diene-based monomer utilized in the art may be suitably utilized.

A thickness of the porous substrate included in the separator may be in a range of, for example, about 1 µm to about 100 µm. The thickness of the porous substrate may be in a range of, for example, about 1 µm to about 30 µm. The thickness of the porous substrate may be in a range of, for example, about 5 µm to about 20 µm. The thickness of the porous substrate may be in a range of, for example, about 5 µm to 15 about µm. The thickness of the porous substrate may be in a range of, for example, about 5 µm to about 10 µm. When the thickness of the porous substrate is less than 1 µm, it may be difficult to maintain a mechanical property of the separator, and when the thickness of the porous substrate is greater than 100 µm, internal resistance of the lithium battery may be increased. A porosity of the porous substrate in the separator may be in a range of about 5% to about 95%. When the porosity is less than 5%, the internal resistance of the lithium battery may be increased, and when the porosity is greater than 95%, it may be difficult to maintain the mechanical property of the porous substrate. A pore size of the porous substrate in the separator may be in a range of about 0.01 µm to about 50 µm. For example, the pore size of the porous substrate in the separator may be in a range of about 0.01 µm to about 20 µm. For example, the pore size of the porous substrate in the separator may be in a range of about 0.01 µm to about 10 µm. When the pore size of the porous substrate is less than 0.01 µm, the internal resistance of the lithium battery may be increased, and when the pore size of the porous substrate is greater than 50 µm, it is difficult to maintain the mechanical property of the porous substrate.

The coating layer may be disposed on one surface or both surfaces of the porous substrate. The coating layer may include the coating composition. The coating layer may have, for example, a single-layered structure or a multi-layered structure. For example, the coating layer may be disposed on only one surface of the porous substrate and may not be disposed on the other surface thereof. In some embodiments, the coating layer may have a multilayered structure. In the coating layer having a multilayered structure, layers selected from an organic layer, an inorganic layer, and an organic/inorganic layer may be arranged in an arbitrary manner. The multi-layered structure may be a two-layered structure, a three-layered structure, or a four-layered structure, but is not limited thereto, and any multi-layered structure may be selected according to the desired or suitable characteristic of a composite separator. The coating layer may be disposed on, for example, both surfaces of the porous substrate. The coating layers disposed on both surfaces (e.g., either surface) of the porous substrate may each be independently an organic layer, an inorganic layer, or an organic/inorganic layer, and at least one of these layers may include the coating composition. In some embodiments, one or more of the coating layers disposed on both surfaces of the porous substrate may have a multi-layered structure. In the coating layer having a multilayered structure, layers selected from an organic layer, an inorganic layer, and an organic/inorganic layer may be arranged in an arbitrary manner. The multi-layered structure may be a two-layered structure, a three-layered structure, or a four-layered structure, but is not limited thereto, and any multi-layered structure may be selected according to the desired or suitable characteristic of the composite separator.

For example, the coating layer included in the separator may have about 0.3 to about 0.4 pores per 1 µm$^2$, each having a diameter of about 500 nm to about 1000 nm, and about 0.5 to about 1.5 pores per 1 µm$^2$, each having a diameter of less than about 500 nm. The pores per having a diameter of about 500 nm to about 1000 nm may be, for example, large-diameter pores, and the pores having a diameter of less than about 500 nm may be, for example, small-diameter pores. When the separator includes large-diameter pores and small-diameter pores in the above density ranges, a composite separator may provide substantially uniform air permeability.

When the number of large-diameter pores of the separator is less than 0.3 and the number of small-diameter pores of the separator is greater than 0.15, the air permeability of the separator may be excessively increased. Therefore, an internal resistance of the separator impregnated in an electrolytic solution may be increased, thereby lowering the cycle characteristic of a lithium battery including the separator. When the number of large-diameter pores of the separator is greater than 0.4 and the number of small-diameter pores of the separator is less than 0.5, the air permeability of the separator may be excessively lowered. Therefore, suppression of lithium dendrite growth during charging/discharging may not be easily achieved, and thus a probability of short circuits occurring in a lithium battery including the separator may be increased. The air permeability may be, for example, a Gurley air permeability obtained by measuring the time taken for 100 cc of air to pass through a separator in accordance with JIS P-8117.

A surface morphology of the coating layer included in the separator may have a plurality of sea-island shaped (e.g., island-shaped) pores discontinuously arranged on, for example, a polymer film. For example, he surface of the coating layer included in the separator may show a morphology having a plurality of pores discontinuously arranged on (e.g., along or within) a polymer film. The coating layer surface may be basically formed of (e.g., as) a polymer film, and may have a morphology having a plurality of pores discontinuously arranged on a polymer film in a sea island structure. When the coating layer of the separator has such a morphology, the separator may have improved bending strength and/or peel strength. Consequently, the lithium battery including the separator may have improved energy density and/or cycle characteristics. In contrast, in related art separators, a polymer film is not shown on the surface of a coating layer included in the separator, but shows a morphology having a plurality of fine particles interconnected to form a porous surface.

An amount of inorganic particles contained in the coating layer may be about 90 wt % or less, about 85 wt % or less, or about 80 wt % or less, based on a total weight of the coating layer. An amount of particles contained in the coating layer prepared from a coating composition may be about 50 wt % or less, about 55 wt % or less, or about 60 wt % or less, based on a total weight of the coating layer. For example, the amount of particles contained in the coating layer prepared from a coating composition may be in a range of about 55 wt % to about 90 wt %, about 60 wt % to about 85 wt %, or about 60 wt % to about 80 wt %, based on a total weight of the coating layer. When the coating layer prepared from the coating composition includes particles in the above ranges, the bending strength and peel strength of the separator may both be improved (e.g., simultaneously).

An average particle diameter of the inorganic particles contained in the coating layer may be in a range of about 300 nm to about 2 μm, about 300 nm to about 1.5 μm, or about 300 nm to about 1.0 μm. The average particle diameter of the inorganic particles may be measured utilizing, for example, laser diffraction and/or dynamic light scattering. An average particle diameter of the inorganic particles may be measured utilizing, for example, a laser scattering particle size distribution measuring apparatus (e.g., a Horiba LA-920 particle size analyzer), and may be a median particle size (D50) value, for example, the particle size at 50% in a volume-based cumulative distribution of particle sizes. By utilizing the inorganic particles having the average particle diameter in the range, a binding force between the coating layer and the porous substrate a binding force between the coating layer and an electrode may both be improved (e.g., simultaneously). When the inorganic particles have the average particle diameter in the above range, the separator including the coating layer containing the inorganic particles may have an appropriate or suitable porosity. When the average particle diameter of the inorganic particles is less than 300 nm, a mechanical property of the separator may be deteriorated.

A thickness of the coating layer per plane may be in a range of, for example, about 0.5 μm to about 3 μm, about 0.5 μm to about 2.5 μm, or about 0.5 μm to about 2 μm. When the thickness of the coating layer per plane is extremely (e.g., unsuitably) large, a wound electrode assembly may have an increased volume. When the thickness of the coating layer per plane is extremely (e.g., unsuitably) small, improved bending strength and peel strength may not be obtained. Because a coating layer is disposed on both (e.g., simultaneously) surfaces of a porous substrate, a binding force between the coating layer and an electrode may be further improved, thereby consequently suppressing a volumetric change in the lithium battery during charging/discharging. For example, referring to FIG. 1, coating layers 12 and 13 may be disposed on opposite surfaces of a porous substrate 11 in a separator, respectively.

A porosity of a coating layer may be in a range of about 30% to about 90%, about 35% to about 80%, or about 40% to about 70%. When the porosity is in the above ranges, the coating layer may prevent or reduce internal resistance of the separator from increasing, and may provide an excellent film strength while having a high-rate characteristic. The porosity of the coating layer refers to a volume of pores occupied in the overall volume of the coating layer.

A coating amount of the coating layer may be in a range of, for example, about 3.5 g/m$^2$ to about 4.5 g/m$^2$, about 3.7 g/m$^2$ to about 4.5 g/m$^2$, about 4.0 g/m$^2$ to about 4.5 g/m$^2$, or about 4.1 g/m$^2$ to about 4.3 g/m$^2$. When the coating amount is in the above ranges, the separator including the coating layer may have improved bending strength and peel strength. When the coating amount of the coating layer is extremely (e.g., unsuitably) low, improved bending strength and/or peel strength may not be obtained.

The binder contained in the coating layer may not have a concentration gradient in which a concentration of the binder is increased toward the of the coating layer surface facing an electrode, from the coating layer surface that is in contact with the porous substrate made of a porous material layer. For example, the binder may have a concentration gradient in which a concentration of the binder is decreased toward the coating layer surface facing an electrode, from the coating layer surface that is in contact with the porous substrate made of a porous material layer, or may have a concentration gradient in which there is no tendency in a concentration change (for example, may have a substantially uniform distribution).

A lithium battery according to another embodiment may include a cathode, an anode, and the separator disposed between the cathode and the anode. According to an embodiment, the lithium battery may include an electrode assembly including a cathode, an anode, and the separator disposed between the cathode and the anode, and the electrode assembly may be wound in a jelly-roll configuration. By including the separator, the lithium battery may have reduced black spot defects, and thus may have improved quality. In some embodiments, adhesion between the electrodes (that is, the cathode and the anode) and the separator may be increased, and thus a volumetric change in the lithium battery may be suppressed during charging/discharging. Therefore, deterioration of the lithium battery and/or a volumetric change of the lithium battery may be suppressed or reduced, thereby improving a life characteristic of the lithium battery.

The lithium battery may be manufactured in the following manner, for example.

First, an anode active material composition including an anode active material, a conductive agent, a binder, and a solvent mixed therein is prepared. The anode active material composition may be directly coated on a metal current collector to prepare an anode plate. In another embodiment, the anode active material composition may be cast on a separate support, and a film exfoliated from the support may then be laminated on a metal current collector to prepare the anode plate. The shape of the anode is not limited to those described, and the anode may have any suitable shape other than the shapes listed herein.

The anode active material may be a non-carbonaceous material. For example, the anode active material may include at least one selected from a metal or a non-metal that is alloyable with lithium, an alloy of a metal with lithium, and an oxide of a metal that is alloyable with lithium.

For example, the lithium-alloyable metal or non-metal may be or include silicon (Si), tin (Sn), aluminum (Al), germanium (Ge), lead (Pb), bismuth (Bi), antimony (Sb), a Si—Y' alloy (where Y' is an alkali metal, an alkali earth metal, a Group 13-16 element excluding Si, a transition metal, a rare earth element, or a combination thereof element), or a Sn—Y' alloy (where Y' is an alkali metal, an alkali earth metal, a Group 13-16 element excluding Sn, a transition metal, a rare earth element, or a combination thereof). The element Y' may be or include magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or a combination thereof.

The oxide of a metal that is alloyable with lithium may be or include a transition metal oxide, a non-transition metal oxide, or a combination thereof. For example, the transition metal oxide may be a lithium titanium oxide, a vanadium oxide, and/or a lithium vanadium oxide.

For example, the non-transition metal oxide may be $SnO_2$, $SiO_x (0<x<2)$, and/or the like.

For example, the anode active material may be at least one selected from Si, Sn, Pb, Ge, Al, SiOx (0<x≤2), SnOy (0<y≤02), $Li_4Ti_5O_{12}$, $TiO_2$, $LiTiO_3$, and $Li_2Ti_3O_7$, but is not limited thereto, and any suitable non-carbonaceous anode active materials in the art may be utilized.

In some embodiments, a composite of the non-carbonaceous anode active material and a carbonaceous material may be utilized, and, in addition to the non-carbonaceous material, a carbonaceous material may be additionally included.

The carbonaceous material may be crystalline carbon, amorphous carbon, or mixture thereof. The crystalline carbon may be or include natural and/or artificial graphite that is non-shaped (e.g., not having a particular shape), plate-shaped, flake-shaped, spherical, and/or fibrous, and the amorphous carbon may be or include soft carbon (cold calcined carbon) or hard carbon, meso-phase pitch carbide, or calcined corks.

Acetylene black, ketjen black, natural graphite, artificial graphite, carbon black, a carbon fiber, a powder of a metal (such as copper, nickel, aluminum, and/or silver), or a metal fiber may be utilized as a conductive material. In some embodiments, a conductive material (such as a polyphenylene derivative) may also be utilized alone or in combination with one or more other conductive materials, but is not limited thereto, and any material that is utilized in the art may be suitably utilized. In some embodiments, the crystalline carbonaceous material may be additionally utilized as the conductive agent.

A vinylidene fluoride/hexafluoropropylene copolymer, polyvinylidene fluoride (PVDF), polyacrylonitrile, polymethylmethacrylate, polytetrafluoroethylene and mixtures thereof, and/or a styrene butadiene rubber based polymer, may be utilized as the binder, but is not limited thereto, and any material utilized as a binder in the art may be suitably utilized.

N-methylpyrrolidone, acetone, and/or water may be utilized as the solvent, but is not limited thereto, and any solvent utilized in the art may be suitably utilized.

The amounts of the anode active material, the conductive agent, the binder, and the solvent may be substantially the same as commonly utilized in a lithium battery. According to the purpose and structure of a lithium battery, one or more of the conductive agent, the binder, and the solvent may not be utilized.

In some embodiments, the binder utilized in manufacturing the anode may be substantially the same as the coating composition contained in the coating layer of the separator.

Next, a cathode active material composition including a cathode active material, a conductive agent, a binder, and a solvent mixed therein, is prepared. The cathode active material composition is directly coated on a metal current collector and dried to prepare a cathode plate. In another embodiment, the cathode active material composition may be cast on a separate support, and a film exfoliated from the support may then be laminated on a metal current collector to prepare a cathode plate.

As the cathode active material, at least one selected from a lithium cobalt oxide, a lithium nickel cobalt manganese oxide, a lithium nickel cobalt aluminum oxide, a lithium iron phosphate oxide, and a lithium manganese oxide may be utilized, but are not limited thereto, and any cathode active material that can be utilized in the art may be suitably utilized.

For example, the cathode active material may be a compound represented by any one of $Li_aA_{1-b}B'bD_2$ (wherein $0.90 \le a \le 1.8$ and $0 \le b \le 0.5$); $Li_aE_{1-b}B'_bO_{2-c}D_c$ (wherein $0.90 \le a \le 1.8$, $0 \le b \le 0.5$, and $0 \le c \le 0.05$); $LiE_{2-b}B'_bO_{4-c}D_c$ (wherein $0 \le b \le 0.5$ and $0 \le c \le 0.05$); $Li_aNi_{1-b-c}Co_bB'_cD_\alpha$ (wherein $0.90 \le a \le 1.8$, $0 \le b \le 0.5$, $0 \le c \le 0.05$, and $0 < \alpha \le 2$); $Li_aNi_{1-b-c}Co_bB'cO_{2-\alpha}F_\alpha$ (wherein $0.90 \le a \le 1.8$, $0 \le b \le 0.5$, $0 \le c$ 0.05, and $0 < \alpha < 2$); $Li_aNi_{1-b-c}Co_bB'CO_{2-\alpha}F_2$ (wherein $0.90 \le a \le 1.8$, $0 \le b \le 0.5$, $0 \le c \le 0.05$, and $0 < \alpha < 2$); $Li_aNi_{1-b-c}Mn_bB'_cD_\alpha$ (wherein $0.90 \le a \le 1.8$, $0 \le b \le 0.5$, $0 \le c \le 0.05$, and $0 < \alpha \le 2$); $Li_aNi_{1-b-c}Mn_bB'_cO_{2-\alpha}F_\alpha$ (wherein $0.90 \le a \le 1.8$, $0 \le b \le 0.5$, $0 \le c \le 0.05$, and $0 < \alpha < 2$); $Li_aNi_{1-b-c}Mn_bB_cO_{2-\alpha}F_2$ (wherein $0.90 \le a \le 1.8$, $0 \le b \le 0.5$, $0 \le c \le 0.05$, and $0 < \alpha < 2$); $Li_aNi_bE_cG'_dO_2$ (wherein $0.90 \le a \le 1.8$, $0 \le b \le 0.9$, $0 \le c \le 0.5$, and $0.001 \le d \le 0.1$.); $Li_aNi_bCo_cMn_dG'_eO_2$ (wherein $0.90 \le a \le 1.8$, $0 \le b \le 0.9$, $0 \le c \le 0.5$, $0 \le d \le 0.5$, and $0.001 \le e \le 0.1$.); $Li_aNiG'_bO_2$ (wherein $0.90 \le a \le 1.8$ and $0.001 \le b \le 0.1$.); $Li_aCoG'_bO_2$ (wherein $0.90 \le a \le 1.8$ and $0.001 \le b \le 0.1$.); $Li_aMnG'_bO_2$ (wherein $0.90 \le a \le 1.8$ and $0.001 \le b \le 0.1$.); $Li_aMn_2G'_bO_4$ (wherein $0.90 \le a \le 1.8$ and $0.001 \le b \le 0.1$.); $QO_2$; $QS_2$; $LiQS_2$; $V_2O_5$; $LiV_2O_5$; $LiI'O_2$; $LiNiVO_4$; $Li_{3-f}J_2(PO_4)_3$ ($0 \le f \le 2$); $Li_{(3-f)}Fe_2(PO_4)_3$ ($0 \le f \le 2$); and $LiFePO_4$.

In the formulas: A is nickel (Ni), cobalt (Co), manganese (Mn), or a combination thereof; B' is Al, Ni, Co, Mn, Cr, Fe, Mg, Sr, V, a rare-earth element, or a combination thereof; D is O, F, S, P, or a combination thereof; E is Co, Mn, or a combination thereof; F is F, S, P, or a combination thereof; G' is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof.

These compounds may have a coating layer on their surfaces, or these compounds may be mixed with a compound having a coating layer. The coating layer may include an oxide of a coating element, a hydroxide of a coating element, an oxyhydroxide of a coating element, an oxycarbonate of a coating element, and/or a hydroxycarbonate of a coating element. The compounds forming the coating layer may be amorphous or crystalline. Non-limiting examples of an element useful or utilized as a coating element included in the coating layer may include Mg, Al, Co, K, Na, Ca, Si, Ti, V, Sn, Ge, Ga, B, As, Zr, or a mixture thereof. The coating layer may be formed by utilizing any suitable coating method that does not affect the desired properties of the cathode active material (for example, spray coating, immersion, and/or the like), and may be well suitable to one of ordinary skill in the art, and thus detailed descriptions thereof will not be given.

For example, $LiNiO_2$, $LiCoO_2$, $LiMn_xO_{2x}$ (x=1, 2), $LiNi_{1-x}Mn_xO_2$ (0<x<1), $LiNi_{1-x-y}Co_xMnyO_2$(0≤x≤0.5, 0≤y≤0.5), $LiFeO_2$, $V_2O_5$, TiS, MoS, etc. may be utilized.

In the cathode active material composition, the conductive agent, the binder, and the solvent may be substantially the same as those utilized in the anode active material composition. In some embodiments, a plasticizer may be further included in the cathode active material composition and/or the anode active material composition to form pores in an electrode plate.

The amounts of the cathode active material, the conductive agent, the typical binder, and the solvent may be substantially the same as utilized in lithium batteries in the art. Depending on the purpose and structure of a lithium battery, one or more of the conductive agent, the typical binder, and the solvent may not be utilized (e.g., may be excluded).

In some embodiments, the binder utilized in manufacturing the cathode may be substantially the same as the coating composition contained in the coating layer of the separator.

Next, the composite separator is disposed between the cathode and the anode.

In the electrode assembly including the cathode, the separator, and the anode arranged in that order, the separator disposed between the cathode and the anode includes: a porous substrate; and a coating layer disposed on both surfaces of the porous substrate, wherein the coating layer includes the coating composition for the separator.

The separator may be separately prepared prior to being disposed between the cathode and the anode. For example, the separator may be further prepared by winding an electrode assembly including a cathode, the separator and an anode in the form of a jelly roll, accommodating the jelly roll in a battery case or a pouch, initially pre-charging the jelly roll while thermally tempering the jelly roll under pressure, hot-rolling the charged jelly roll, cold-rolling the charged jelly roll, and performing a formation step (or act) of charging/discharging the charged jelly roll under pressure.

Next, an electrolyte is prepared.

The electrolyte may be in a liquid or gel phase.

For example, the electrolyte may be an organic electrolytic solution. In some embodiments, the electrolyte may be a solid electrolyte. For example, boron oxide, lithium oxynitrite, and/or the like, may be utilized, but the electrolyte is be limited thereto, and the electrolyte may be any one of various suitable materials that are utilized as a solid electrolyte in the art. The solid electrolyte may be formed on the anode by, for example, sputtering.

For example, an organic electrolytic solution may be prepared. The organic electrolytic solution may be prepared by dissolving a lithium salt in an organic solvent.

The organic solvent may be any material that can be utilized as an organic solvent in the art. Non-limiting examples of the organic solvent may include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyl tetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, diethyleneglycol, dimethylether, or a mixture thereof.

The lithium salt may also be any lithium salt that can be utilized in the art. Non-limiting examples of the lithium salt may include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each a natural number), LiCl, LiI, or a mixture thereof.

Figure 2:
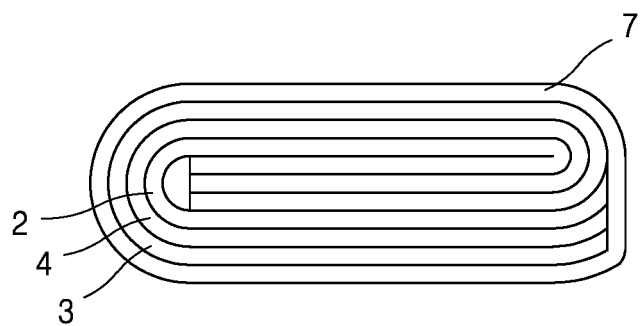
FIG. 2 is a schematic view of a lithium battery including an electrode assembly wound in a flat jelly-roll configuration according to an example embodiment.

As shown in FIG. 2, an example lithium battery includes a cathode 3, an anode 2, and a separator (e.g., the composite separator) 4. The cathode 3, the anode 2, and the separator 4 are wound into a jelly-roll type or kind electrode assembly and then accommodated in a pouch 7. Subsequently, an organic electrolytic solution is injected into the pouch 7, and the resulting structure is sealed, thereby completing the manufacturing of the lithium battery.

Figure 3:
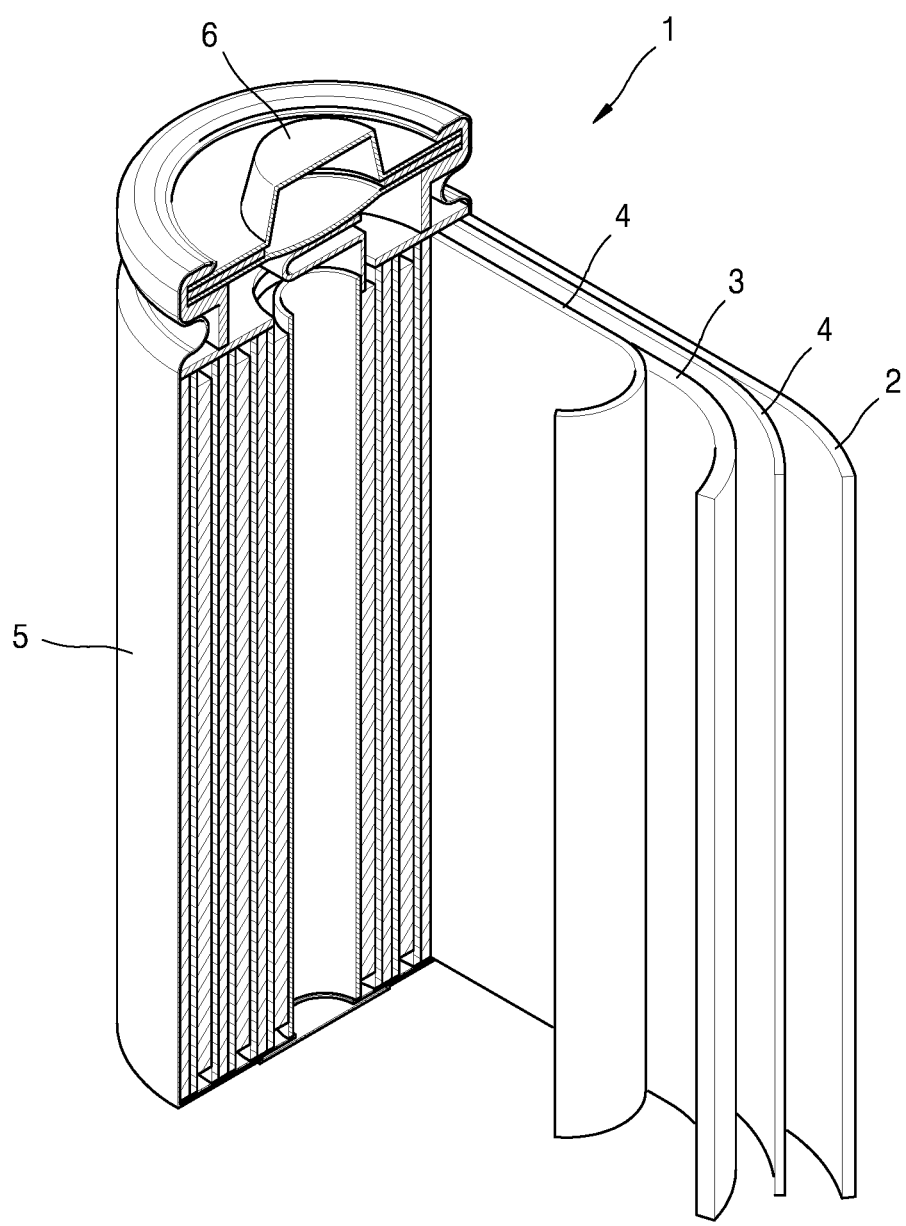
FIG. 3 is a schematic view of a lithium battery including an electrode assembly wound in a cylindrical jelly-roll configuration according to an example embodiment.

As shown in FIG. 3, an example lithium battery 1 includes the cathode 3, the anode 2, and the separator 4. The cathode 3, the anode 2, and the separator 4 are wound into a cylindrical jelly-roll type or kind electrode assembly and then accommodated in a battery case 5. Subsequently, an organic electrolytic solution is injected into the battery case 5, and the result structure is sealed with a cap assembly 6, thereby completing the manufacturing of the lithium battery 1. The battery case may have a cylindrical shape, a prismatic shape, or a thin-film shape. The lithium battery may be a lithium ion battery. The lithium battery may be a lithium polymer battery.

A lithium battery has excellent high-rate characteristic and life characteristic, and thus may be suitably utilized in an electric vehicle (EV). For example, the lithium battery may be suitably utilized in a hybrid car (such as a plug-in hybrid electric vehicle (PHEV)).

The present disclosure will now be described in more detail with reference to Examples and Comparative Examples. However, the following examples are presented for illustrative purpose only, and do not limit the scope of the present disclosure.

(Preparation of Separator)

Example 1

A PVdF-HFP polymer as a fluorine-based binder having a weight average molecular weight (Mw) of 900,000 g/mol (including PVdF and HFP mixed in a molar ratio of 98:2 and having a glass transition temperature of –30° C. and a melting point of 150° C.) in an amount of 10 wt % was added to acetone. The mixture was stirred at 45° C. for 3 hours utilizing a stirrer, thereby preparing a binder solution.

25 wt % of alumina having an average particle diameter of 0.4-0.6 μm (D50 based on volume) (AES-11, Sumitomo Chemical Co., Ltd.) in forms of inorganic particles was added to acetone, milled at 25° C. for 4 hours utilizing a bead mill to be dispersed, thereby preparing an inorganic particle dispersion. As a dispersant in the inorganic particle dispersion, a trimethoxy-based silane coupling agent (3-methacryloxypropyl trimethoxysilane, KBM 503 manufactured by ShinEtsu) having three carbons in its alkyl chain was utilized in an amount of 1 part by weight, based on 100 parts by weight of the inorganic particles.

The binder solution and the inorganic particle dispersion were mixed so as to have a weight ratio of 40:60, a polymeric additive P104 (BYK-Chemie GmbH) and a polyethylene glycol (PEG) were each added thereto in an amount of 5 parts by weight, based on 100 parts by weight of alumina solids, followed by stirring at 25° C. for 4 hours utilizing a power mixer, thereby preparing a coating solution. P104 includes a mixture of oleic acid, stearic acid, palmitic acid, and nervonic acid in a weight ratio of about (9 to 10):(9 to 10):(9 to 10):(8 to 9).

The coating solution was directly coated on both (e.g., simultaneously) surfaces of a 7 μm thick polyethylene (PE) porous substrate (SK Innovation Co., Ltd.), and then dried at a heat blast temperature of 65° C. while injecting 13 g/m$^3$ of water vapor, thereby preparing the separator having a coating layer formed thereon. A coating thickness after drying was 2.5 μm.

Example 2

A separator was prepared in the same manner as in Example 1, except that parts by weight of a polymeric additive P104 and 3 parts by weight of PEG were mixed, based on 100 parts by weight of alumina solids, in preparing a coating solution.

Example 3

A separator was prepared in the same manner as in Example 1, except that as a dispersant in the inorganic particle dispersion, the silane coupling agent having three carbons in its alkyl chain was utilized in an amount of 1.5 parts by weight, based on 100 parts by weight of the inorganic particles.

Comparative Example 1

A separator was prepared in the same manner as in Example 1, except that only a polymeric additive P104 was utilized in an amount of 5 parts by weight, based on 100 parts by weight of alumina solids, in preparing a coating solution.

Comparative Example 2

A separator was prepared in the same manner as in Example 1, except that only a polymeric additive P104 was utilized in an amount of 3 parts by weight, based on 100 parts by weight of alumina solids, in preparing a coating solution.

Comparative Example 3

A separator was prepared in the same manner as in Example 1, except that only a polymeric additive P104 was utilized in an amount of 1 part by weight, based on 100 parts by weight of alumina solids, in preparing a coating solution.

Comparative Example 4

A separator was prepared in the same manner as in Example 1, except that only PEG was utilized in an amount of 5 parts by weight, based on 100 parts by weight of alumina solids, in preparing a coating solution.

Comparative Example 5

A separator was prepared in the same manner as in Example 1, except that a trimethoxy-based silane coupling agent having three carbons in its alkyl chain and a trimethoxy-based silane coupling agent having eight carbons in its alkyl chain (8 methacryloxyoctyl trimethoxysilane, KBM 5803 manufactured by ShinEtsu) were each mixed in an amount of 0.5 parts by weight, based on 100 parts by weight of alumina solids, and then utilized as a dispersant in preparing a inorganic particle dispersion.

Comparative Example 6

A separator was prepared in the same manner as in Example 1, except that a trimethoxy-based silane coupling agent having eight carbons in its alkyl chain (8-methacryloxyoctyl trimethoxysilane, KBM 5803 manufactured by ShinEtsu) was mixed in an amount of 1 part by weight, based on 100 parts by weight of alumina solids, as a dispersant in preparing a inorganic particle dispersion.

(Manufacture of Lithium Battery)

Example 3

(Preparation of Anode)

97 wt % of graphite particles ($C_1SR$, Japan carbon) having an average particle diameter of 25 μm, 1.5 wt % of styrene-butadiene rubber (SBR) binder (Zeon), and 1.5 wt % of carboxymethyl cellulose (CMC, NIPPON A&L) were mixed, and the resulting mixture was added to distilled water and stirred for 60 minutes utilizing a mechanical stirrer, thereby preparing an anode active material slurry. The slurry was coated on a 10 μm thick copper current collector utilizing a doctor blade, dried in a heat blast drier at a temperature of 100° C. for 0.5 hours, dried again in a vacuum condition at a temperature of 120° C. for 4 hours, and then roll-pressed, thereby preparing an anode plate.

(Preparation of Cathode)

97 wt % of $LiCoO_2$, 1.5 wt % of carbon black powder as a conductive agent, and 1.5 wt % of polyvinylidene fluoride (PVdF, SOLVAY) were mixed, and the resulting mixture was added to a N-methyl-2-pyrrolidone solvent, followed by stirring utilizing a mechanical stirrer for 30 minutes, thereby preparing a cathode active material slurry. The slurry was coated on a 20 μm thick aluminum current collector utilizing a doctor blade, dried in a heat blast drier at a temperature of 100° C. for 0.5 hours, dried again in a vacuum condition at a temperature of 120° C. for 4 hours, and then roll-pressed, thereby preparing a cathode plate.

(Electrode Assembly Jelly Roll)

The separator prepared in Example 1 was placed between the cathode plate and the anode plate and then wound, thereby preparing an electrode assembly jelly roll. The jelly roll was inserted into a pouch, and an electrolytic solution was inserted into the pouch, followed by vacuum-sealing the pouch.

The electrolytic solution utilized was prepared by dissolving 1.3 M $LiPF_6$ in a mixed solvent of ethylene carbonate (EC)/ethylmethyl carbonate (EMC)/diethyl carbonate (DEC) in a volume ratio of 3:5:2.

The jelly roll inserted into the pouch was thermally softened at a temperature of 70° C. for 1 hour while applying a pressure of 250 kgf/cm$^2$.

Subsequently, the jelly roll was hot-pressed at a temperature of 85° C. for 180 seconds while applying a pressure of 200 kgf/cm².

Next, the jelly roll was cold-pressed at a temperature of 22-23° C. for 90 seconds while applying a pressure of 200 kgf/cm².

Then, the pouch was degassed, thereby preparing a lithium battery including an electrode assembly wound in a jelly-roll configuration.

Example 4

A lithium battery was manufactured in substantially the same manner as in Example 3, except that the separator prepared in Example 2 was utilized.

Comparative Examples 7-12

Additional lithium batteries were manufactured in substantially the same manner as in Example 3, except that the separators prepared in Comparative Examples 1-6 were utilized.

Evaluation Example 1: Evaluation of Long-Term Storage Stability of Coating Solution To evaluate the long-term storage stability of each of the coating solutions prepared in Examples 1-2 and Comparative Examples 1-6, particle sizes of alumina particles immediately after milling, and particle sizes after the coating solutions were stored at room temperature for 10 days were analyzed, and the results thereof are indicated and compared in Table 1.

TABLE 1

|  | Particle size after milling | | Particle sizes after 10 day storage of coating solutions | |
| --- | --- | --- | --- | --- |
|  | D50 | D95 | D50 | D95 |
| Example 1 | 0.52 | 1.42 | 0.51 | 1.87 |
| Example 2 | 0.53 | 1.41 | 0.55 | 1.93 |
| Comparative Example 1 | 0.51 | 1.32 | 0.53 | 2.46 |
| Comparative Example 2 | 0.54 | 1.36 | 0.53 | 2.83 |
| Comparative Example 3 | 0.53 | 1.29 | 0.52 | 3.42 |
| Comparative Example 4 | 0.52 | 1.34 | 0.57 | 12.6 |
| Comparative Example 5 | 0.54 | 1.68 | 0.59 | 16.4 |
| Comparative Example 6 | 0.61 | 2.15 | 0.64 | 18.9 |

As shown in Table 1, the particle sizes (D50 and D95) of the inorganic particles contained in the coating solutions prepared in Examples 1 and 2 were not significantly increased due to suppressed or reduced aggregation of the coating solutions, compared to those of the inorganic particles contained in the coating solutions prepared in Comparative Examples 1 to 6. This confirmed that the coating solutions prepared in Examples 1 and 2 had improved long-term storage stability.

Evaluation Example 2: Measurement of Number of Black Spots on Coated Separator

To evaluate the physical properties of the coated separators prepared in Examples 1 and 2 and Comparative Examples 1 to 6, the number of black spots having a size of 100 μm or greater per unit area (1 m²) was measured in manner.

Black spots of 100 μm or greater detected at a driving speed of 40 mpm were measured utilizing a defect tester with a reflection-type or kind dual camera mounted on an in-line defect tester (light source: LED) mounted at a front end of a coater winder. The camera utilized in the measurement is a line scan camera having a resolution of 80-130 μm/pixel. The number of black spots of 100 μm or greater, which are measured in the overall area of 1000 m² of a film coated on each separator (1 m in width and 1000 m in length), was counted and divided by 1000, thereby counting the number of black spots per unit area (1 m²) up to two decimal places, and the results are indicated in Table 2.

TABLE 2

|  | Number of black spots |
| --- | --- |
| Example 1 | 0.01 |
| Example 2 | 0.01 |
| Comparative Example 1 | 0.04 |
| Comparative Example 2 | 0.09 |
| Comparative Example 3 | 0.11 |
| Comparative Example 4 | 0.33 |
| Comparative Example 5 | 0.36 |
| Comparative Example 6 | 0.42 |

As shown in Table 2, the separators prepared in Examples 1 and 2 have a considerably reduced number of black spots, compared to the separators prepared in Comparative Examples 1 to 6.

According to an aspect, the coating composition for the separator may have secured long-term storage stability and thus provide a composite separator having a reduced number of black spot defects in coating the separator.

As used herein, the terms "substantially," "about," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the drawings, it will be understood by those of ordinary skill in the art that various changes in form and details may be made therein without departing from the spirit and scope as defined by the following claims and equivalents thereof.

What is claimed is:

1. A coating composition for a separator, the coating composition comprising:
   inorganic particles;
   a binder;
   a silane-based dispersant; and
   a polymeric additive,
   wherein:
   the silane-based dispersant consists of a silane-based compound comprising an alkyl main chain having one to seven carbons,
   the polymeric additive comprises a fatty acid compound and a polymer polyol,
   the silane-based compound comprises at least one selected from a vinyl alkyl alkoxysilane, an epoxy alkyl alkoxysilane, an amino alkyl alkoxysilane, a mercaptoalkyl alkoxysilane, a halogenated alkyl alkoxysilane, and an alkyl acyloxysilane,
   the fatty acid compound comprises a C15 to C30 unsaturated fatty acid compound, a C15 to C30 saturated fatty acid compound, or a combination thereof,
   the polymer polyol comprises one or more selected from a polycarbonate polyol, a polyester polyol, polyether polyol, a poly(meth)acryl polyol, and a polydiene polyol,
   wherein an acid value of the fatty acid compound is about 20 mg KOH/g to about 600 mg KOH/g, and
   wherein:
   an amount of the polymeric additive is about 1 to about 20 parts by weight, based on 100 parts by weight of the inorganic particles,
   a weight ratio of the fatty acid compound and the polymer polyol is about 1:0.2 to about 1:2, and
   the polymer polyol has a number average molecular weight of about 500 to about 5000, and has no alicyclic structure.

2. The coating composition of claim 1, further comprising an organic solvent.

3. The coating composition of claim 1, wherein the silane-based compound comprises the alkyl main chain having three to five carbons.

4. The coating composition of claim 1, wherein the silane-based compound comprises at least one functional group selected from alkoxy, halogen, amino, vinyl, glycidoxy, and hydroxy.

5. The coating composition of claim 1, wherein an amount of the silane-based dispersant is about 0.5 to about 1.5 parts by weight, based on 100 parts by weight of the inorganic particles.

6. The coating composition of claim 1, wherein the C15 to C30 unsaturated fatty acid compound comprises one or more selected from oleic acid, palmitoleic acid, cis-hepta- decenoic acid, vaccenic acid, elaidic acid, linolenic acid, arachidonic acid, eicosenoic acid, erucic acid, eicosapentaenoic acid (EPA), docosahexaenoic acid (DHA), and nervonic acid.

7. The coating composition of claim 1, wherein the C15 to C30 saturated fatty acid compound comprises one or more selected from palmitic acid, stearic acid, arachidic acid, behenic acid, and lignoceric acid.

8. The coating composition of claim 1, wherein the fatty acid compound comprises two or more different unsaturated fatty acid compounds.

9. The coating composition of claim 1, wherein the inorganic particles comprises one or more selected from alumina, titania, boehmite, and barium sulfate.

10. The coating composition of claim 1, wherein a weight ratio of the inorganic particles and the binder is about 40:60 to about 80:20.

11. The coating composition of claim 1, wherein the weight ratio of the fatty acid compound and the polymer polyol is about 1:0.2 to about 1:1.5.

12. The coating composition of claim 1, wherein the polymer polyol comprises a polyether polyol.

13. The coating composition of claim 12, wherein the polyether polyol comprises a polyethylene glycol, a polypropylene glycol, a polytetramethylene glycol, a random or block copolymer of ethylene oxide and propylene oxide, and/or a random or block copolymer of ethylene oxide and butylene oxide.

14. The coating composition of claim 1, wherein the binder comprises a fluorine-based binder.

15. The coating composition of claim 14, wherein the fluorine-based binder comprises a vinylidene fluoride-hexafluoropropylene copolymer, and
   the vinylidene fluoride-hexafluoropropylene copolymer has a glass transition temperature of about −10° C. or less and a melting point of about 150° C. or greater.

16. The coating composition of claim 15, wherein a weight average molecular weight of the vinylidene fluoride-hexafluoropropylene copolymer is about 700,000 to about 1,200,000.

17. A method of preparing a separator, the method comprising:
   coating the coating composition according to claim 1 on one or both surfaces of a porous substrate; and
   heat-blast drying the porous substrate coated with the coating composition to obtain the separator having a coating layer on the porous substrate,
   wherein a non-solvent comprising one or more selected from water and alcohol is supplied during the heat-blast drying, and an amount of the non-solvent is about 12 g/m$^3$ to about 17 g/m$^3$.

18. The method of claim 17, wherein the heat-blast drying is conducted at a temperature of about 30° C. to about 80° C.

19. A separator comprising:
   a porous substrate; and
   a coating layer comprising the coating composition according to claim 1 on one or both surfaces of the porous substrate,
   wherein
   a total number of black spots per square meter is smaller than about 0.04.

* * * * *